United States Patent
Chang et al.

(10) Patent No.: US 8,880,683 B2
(45) Date of Patent: Nov. 4, 2014

(54) GLOBAL REAL-TIME NETWORK RESOURCE AND TIMER SYNCHRONIZATION

(75) Inventors: Patricia Ruey-Jane Chang, San Ramon, CA (US); Vikram K. Rawat, San Ramon, CA (US); Jay J. Lee, San Ramon, CA (US); Deepak Kakadia, Union City, CA (US); Lee K. Tjio, Danville, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 987 days.

(21) Appl. No.: 12/975,965

(22) Filed: Dec. 22, 2010

(65) Prior Publication Data

US 2012/0166617 A1     Jun. 28, 2012

(51) Int. Cl.
*G06F 15/173* (2006.01)
*H04W 76/02* (2009.01)
*H04W 76/06* (2009.01)

(52) U.S. Cl.
CPC .............. *H04W 76/02* (2013.01); *H04W 76/06* (2013.01)

USPC ............ 709/224; 370/328; 370/331; 370/338

(58) Field of Classification Search
CPC ................................................... H04L 43/0811
USPC ........................................................ 709/224
See application file for complete search history.

(56) References Cited

U.S. PATENT DOCUMENTS

2012/0039213 A1* 2/2012 Cheng et al. .................. 370/254
2012/0264443 A1* 10/2012 Ng et al. ....................... 455/450

* cited by examiner

*Primary Examiner* — Glenford Madamba

(57) ABSTRACT

A device receives, from multiple network elements, status information for a user equipment (UE) connection associated with a wireless core network and updates, based on the status information received from the network elements, a database record for the UE connection. The device receives, from an application server, a request for information associated with the UE connection and constructs, based on the request and from the database record, a resource message that includes real-time information about the UE connection. The device sends the resource message to the application server. The device also provides a disconnect message to the application server and/or the network elements when the status information received from the network elements indicates that the UE has been disconnected from the wireless core network.

19 Claims, 10 Drawing Sheets

GLOBAL REAL-TIME NETWORK RESOURCE AND TIMER SYNCHRONIZATION

BACKGROUND

The Evolved Packet System (EPS) is the network architecture of the third generation partnership project (3GPP) wireless communication standard. During a communication session between a user equipment (UE) and a long term evolution (LTE) network, the UE interfaces with an evolved packet core (EPC), that is one of the main components of the EPS. The EPC is capable of processing various types of traffic (e.g., video, voice, text, etc.) at higher throughput and/or bandwidth than previous generation architectures (e.g., pre-3GPP networks). The various types of traffic are often associated with high bandwidth and/or data rates, which are often generated by high bandwidth applications (e.g., social networking, cloud computing, email, gaming, etc.). However, not all applications generate traffic associated with high bandwidth and/or data rates. Some low bandwidth applications (e.g., Instant Messaging (IM), Internet-based chat sessions, etc.) may generate low bandwidth traffic and/or be associated with long session times and/or long intervals of inactivity (e.g., a period of time between messages or packets).

Various network elements within the EPS use timers to keep track of a UE that is connected to the network. A network element may, for example, tear down a connection with a UE based on a timer. Application servers (e.g., that provide services to a UE through the EPS) may also use timers to manage sessions with UE. Currently, the network element timers and the application server timers are not synchronized. Thus, a network element can close a connection based on a local timer, while another network element or application server would still consider the connection valid based on other local timers.

Network elements within an EPS network also monitor other information associated with a UE connection. For example, data rates, quality-of-service (QoS) guarantees, packet loss, and other information about a current connection may be known to various different network elements. However, this information may not be known to application servers and/or other network elements on a real-time basis.

DETAILED DESCRIPTION OF PREFERRED EMBODIMENTS

The following detailed description refers to the accompanying drawings. The same reference numbers in different drawings may identify the same or similar elements.

Systems and/or methods described herein may provide global real-time resource and timer synchronization for a wireless core network. The systems and/or methods may collect connection status and/or timer information from network elements (e.g., associated with different layers of the network) for particular user equipment (UE) connections. The connection status and/or timer information may be updated in real-time and distributed to application servers outside the wireless core network and/or to the different network elements. The systems and/or methods may, for example, notify application servers and/or network elements when a particular UE is disconnected from the network. The systems and/or methods may also allow application service providers to optimize delivery of services based on the connection status and/or timer information.

In one example implementation, a global resource information server may be included within a wireless core network. The server may receive, from multiple network elements, status information for a UE connection associated with a wireless core network and may update, based on the status information, a database record for the UE connection. The server may receive, from an application server, a request for information associated with the UE connection and may generate, based on the request and the database record, a resource message that includes real-time information about the UE connection. The server may send the resource message to the application server. The server may also provide a disconnect message to the application server and/or the network elements when the status information received from the network elements indicates that the UE has been disconnected from the wireless core network.

In another example implementation, an application server may receive, from a UE, a request for a service. The application server may send, to the global resource information server within the wireless core network, a request for network connection information associated with the UE, where the request for the network connection information associated with the UE is initiated based on the request for the service. The application sever may receive, from the global resource information server, the network connection information associated with the UE, and may adjust, based on the network connection information associated with the UE, an attribute of the service prior to providing the service. The application server may, thus, provide appropriately provisioned services to the UE, via the wireless core network, without relying on UE feedback.

As used herein, the terms "subscriber" and/or "user" may be used interchangeably. Also, the terms "subscriber" and/or "user" are intended to be broadly interpreted to include a UE or a user of a UE.

Figure 1:
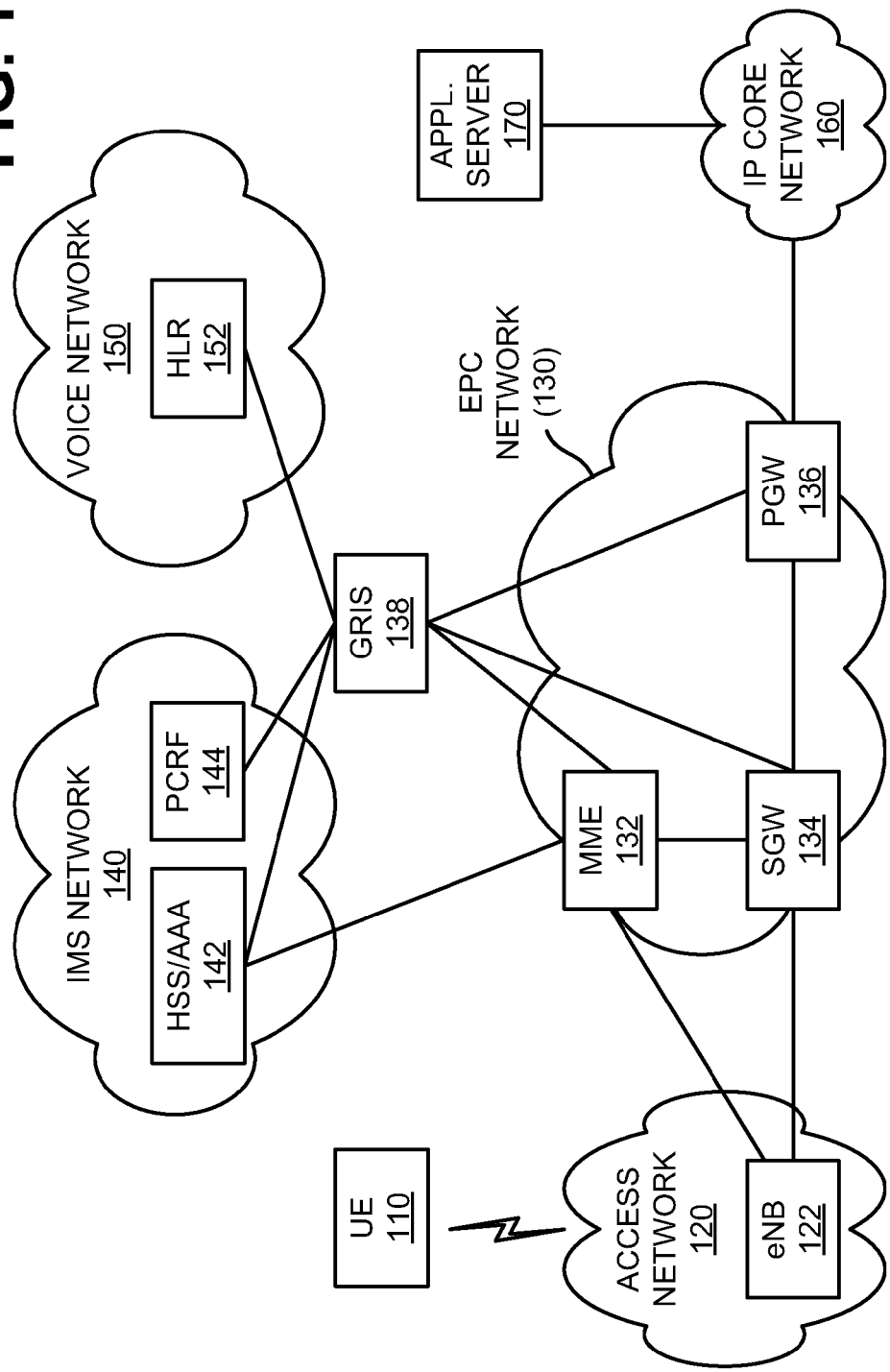
FIG. 1 is a diagram of an example network in which systems and/or methods described herein may be implemented.

FIG. 1 is a diagram of an example network 100 in which systems and/or methods described herein may be implemented. As illustrated, network 100 may include a UE 110, an access network 120, an EPC network 130, a global resource information server (GRIS) 138 (referred to herein as "GRI server 138"), an IP multimedia subsystem (IMS) network 140, a voice network 150, an IP core network 160, and an application server 170. Access network 120 may include an eNodeB (eNB) 122. EPC network 130 may include a mobility management entity (MME) 132, a serving gateway (SGW) 134, and a packet data network (PDN) gateway (PGW) 136. IMS network 140 may include a home subscriber server (HSS/AAA) 142 and a policy and charging rules function (PCRF) 144. Voice network 150 may include a home location register (HLR) 152. Devices and/or networks of network 100 may interconnect via wired and/or wireless connections.

A single UE 110, access network 120, eNB 122, EPC network 130, MME 132, SGW 134, PGW 136, GRI server 138, IMS network 140, HSS/AAA 142, PCRF 144, voice network 150, HLR 152, IP core network 160, and application server 170 have been illustrated in FIG. 1 for simplicity. In practice, there may be more UEs 110, access networks 120, eNBs 122, EPC networks 130, MMEs 132, SGWs 134, PGWs 136, GRI servers 138, IMS networks 140, HSS/AAAs 142, PCRFs 144, voice networks 150, HLRs 152, IP core networks 160, and/or application servers 170.

UE 110 may include a radiotelephone, a personal communications system (PCS) terminal (e.g., that may combine a cellular radiotelephone with data processing and data communications capabilities), a wireless device, a smart phone, a personal digital assistant (PDA) (e.g., that can include a radiotelephone, a pager, Internet/intranet access, etc.), a laptop computer (e.g., with a wireless air card), or a global positioning system (GPS) device, other types of computation or communication devices. In an example implementation, UE 110 may include a device that is capable of communicating over access network 120, EPC network 130, IMS network 140, voice network 150, and/or IP core network 160.

Access network 120 may include a wireless communications network that connects subscribers (e.g., UE 110) to a service provider. In one example, access network 120 may include a LTE network, a WiFi network (e.g., using IEEE 802.11 standards) or other access networks (e.g., an E-UTRAN, an enhanced high-rate packet data (eHRPD) network, or another 3G, 4G, or future access network). In another example, access network 120 may include a radio access network capable of supporting high data rate, low latency, packet optimization, large capacity and coverage, etc.

eNB 122 may include one or more computation and/or communication devices that receive voice and/or data from MME 132 and/or SGW 134 and wirelessly transmit that voice and/or data to UE 110. eNB 122 may also include one or more devices that wirelessly receive voice and/or data from UE 110 and transmit that voice and/or data to one of MME 132 and/or SGW 134 or to other UEs 110. eNB 122 may combine the functionalities of a base station and a radio network controller (RNC) in 2G or 3G radio access networks. In one implementation, eNB 122 may include a timer to time a dormant (or inactive) state of UE 110.

EPC network 130 may include a core network architecture of the 3GPP LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and/or communication devices that may be responsible for idle mode tracking and paging procedures (e.g., including retransmissions) for UE 110. MME 132 may be involved in a bearer activation/deactivation process (e.g., for UE 110) and may choose a SGW for UE 110 at an initial attach and at a time of intra-LTE handover. MME 132 may authenticate UE 110 (e.g., via interaction with HSS/AAA 142). Non-access stratum (NAS) signaling may terminate at MME 132, and MME 132 may generate and allocate temporary identities to UEs (e.g., UE 110). MME 132 may check authorization of UE 110 to camp on a service provider's Public Land Mobile Network (PLMN) and may enforce roaming restrictions for UE 110. MME 132 may provide a control plane function for mobility between LTE and access networks. In one implementation, MME 132 may provide an idle mode UE tracking and paging procedure that includes retransmissions. In one example implementation, MME 132 may receive an IP core network connection request from UE 110, and may exchange, with HSS/AAA 142, authentication and/or authorization information associated with UE 110.

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 134 may route and forward user data packets, may act as a mobility anchor for a user plane during inter-eNB handovers, and may act as an anchor for mobility between LTE and other 3GPP technologies. SGW 134 may include a local resource timer to manage network resources. For idle state UEs 110, SGW 134 may terminate a downlink (DL) data path. SGW may then trigger paging when DL data arrives for UE 110. SGW 134 may manage and store contexts associated with UE 110 (e.g., parameters of an IP bearer service, network internal routing information, etc.).

PGW 136 may include one or more data transfer devices (or network devices), such as a gateway, a router, a switch, a firewall, a NIC, a hub, a bridge, a proxy server, an OADM, or some other type of device that processes and/or transfers data. In one example implementation, PGW 136 may provide connectivity of UE 110 to external PDNs (e.g., in IP core network 160) by being a traffic exit/entry point for UE 110. UE 110 may simultaneously connect to more than one PGW 136 for accessing multiple PDNs. PGW 136 may perform policy enforcement, packet filtering for each user, charging support, lawful intercept, and packet screening. PGW 136 may also act as an anchor for mobility between 3GPP and non-3GPP technologies.

GRI server 138 may include one or more server devices, or other types of computation or communication devices that gather, process, search, and/or provide information in a manner described herein. In one example implementation, GRI server 138 may receive, from other network elements (e.g., eNB 122, MME 132, SGW 134, PGW 136, HSS/AAA 142, PCRF 144, and/or HLR 152), real-time information associated with traffic conditions (e.g., throughput, bandwidth, etc.) for applications, data, and/or services that can be used by UE 110. GRI server 138 may provide this real-time information to application servers (e.g., application server 170) and/or the other network elements. GRI server 138 is described further in connection with, for example, FIGS. 2-6.

IMS network 140 may include an architectural framework or network (e.g., a telecommunications network) for delivering IP multimedia services.

HSS/AAA 142 may include one or more devices that function as a HSS for access network 120 and/or that act as an AAA server for access network 120. For example, HSS/AAA 142 may store information associated with a subscriber, services that the subscriber has requested or been assigned and settings associated with the services, and/or a current location of the subscriber. Furthermore, HSS/AAA 142 may verify a subscriber's identity, authenticate and/or authorize a user device 110 using a user device identification number (e.g., by performing MAC authentication), authorize a particular service, and/or track consumption of network resources for a particular subscriber. In one implementation, HSS/AAA 142 may interface with UE 110, SGW 134, PGW 136, and/or application servers 170 and may provide information to application server 170 that enables application servers 170 to communicate with UE 110 using IP-based communication protocols.

PCRF 144 may include one or more computation or communication devices that may provide policy control decision and flow based charging control functionalities. PCRF 144 may perform operations that enforce network policies associated with a communication session with UE 110. PCRF 144 may provide network control regarding service data flow detection, gating, QoS and flow based charging, etc. PCRF 144 may determine how a certain service data flow shall be treated, and may ensure that user plane traffic mapping and treatment is in accordance with a user's subscription profile.

Voice network 150 may include an architectural framework or network (e.g., a telecommunications network) for delivering voice traffic. Voice network may include HLR 152 as well as other equipment (not shown), such as a mobile switching center (MSC), a signal transfer point (STP), and Signaling System 7 (SS7) links.

HLR 152 may include one or more devices that store information about subscribers of access network 120. For example, HLR 152 may store information associated with a universal integrated circuit card (UICC) associated with a subscriber, services that the subscriber has requested or been assigned and settings associated with the services, and/or a current location of the subscriber.

IP core network 160 may include one or more networks (e.g., a local area network (LAN), a wide area network (WAN), a metropolitan area network (MAN), the Internet, etc.) capable of communicating with UE 110.

Application server 170 include one or more server devices, or other types of computation or communication devices that gather, process, search, and/or provide information in a manner described herein. Application server 170 may communicate via IP core network 160 and EPC network 130. In one example implementation, application server 170 may provide applications, data, and/or services to UE 110. In one example implementation, application server 170 may be a web server that hosts a website from which UE device 110 can receive applications, data, and/or services. In another example, application server 170 may be a content delivery server that provides broadcast video streams, Video on Demand (VoD) content, or other multimedia content. In other implementations, application server 170 may provide location-based services.

During UE 110 attachment to EPC network 130, EPC network 130 may separate a signaling plane and a user plane as UE 110 communicates with EPC network 130. The signaling plane may be handled by MME 132, and the user plane may be handled by SGW 134. UE 110 may first communicate with MME 132 during a UE authentication and authorization process. During this process, MME 132 may select a PGW (e.g., PGW 136) for UE 110 when UE 110 attempts to access IP core network 160 (e.g., to connect to application server 170).

Although FIG. 1 shows example devices/networks of network 100, in other implementations, network 100 may include fewer devices/networks, different devices/networks, differently arranged devices/networks, or additional devices/networks than depicted in FIG. 1. For example, although shown as a separate component in FIG. 1, in another implementation, GRI server 138 may be combined with one or more other devices and/or functions. In one implementation, the functions of GRI server 138 may be combined with PCRF 144. In other example implementations, the functions of GRI server 138 may be combined with HSS/AAA 142, another device in network 100, or a combination of devices. Alternatively, or additionally, one or more devices/networks of network 100 may perform one or more other tasks described as being performed by one or more other devices/networks of network 100.

Figure 2:
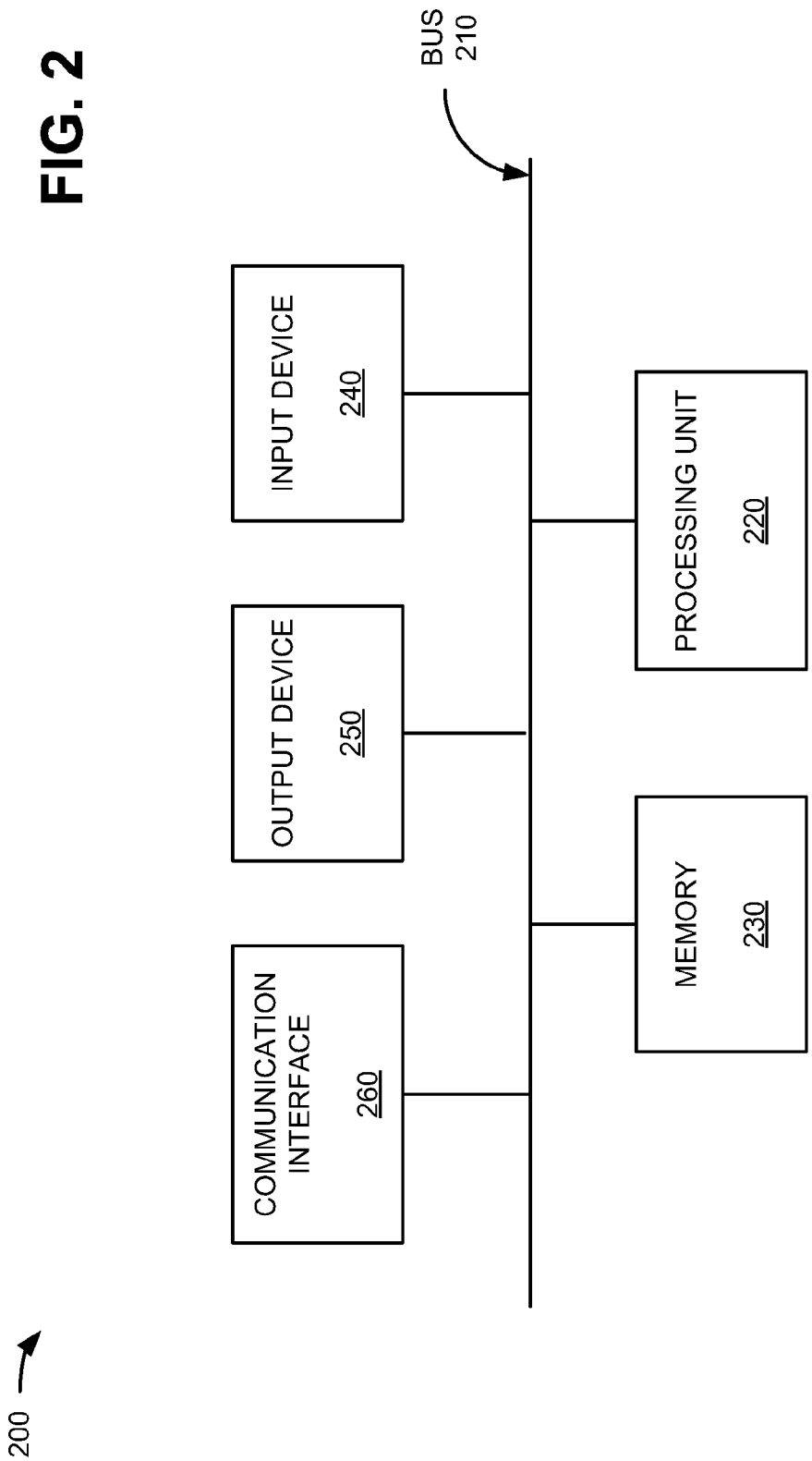
FIG. 2 is a diagram of example components of a device that may correspond to one of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG.

2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
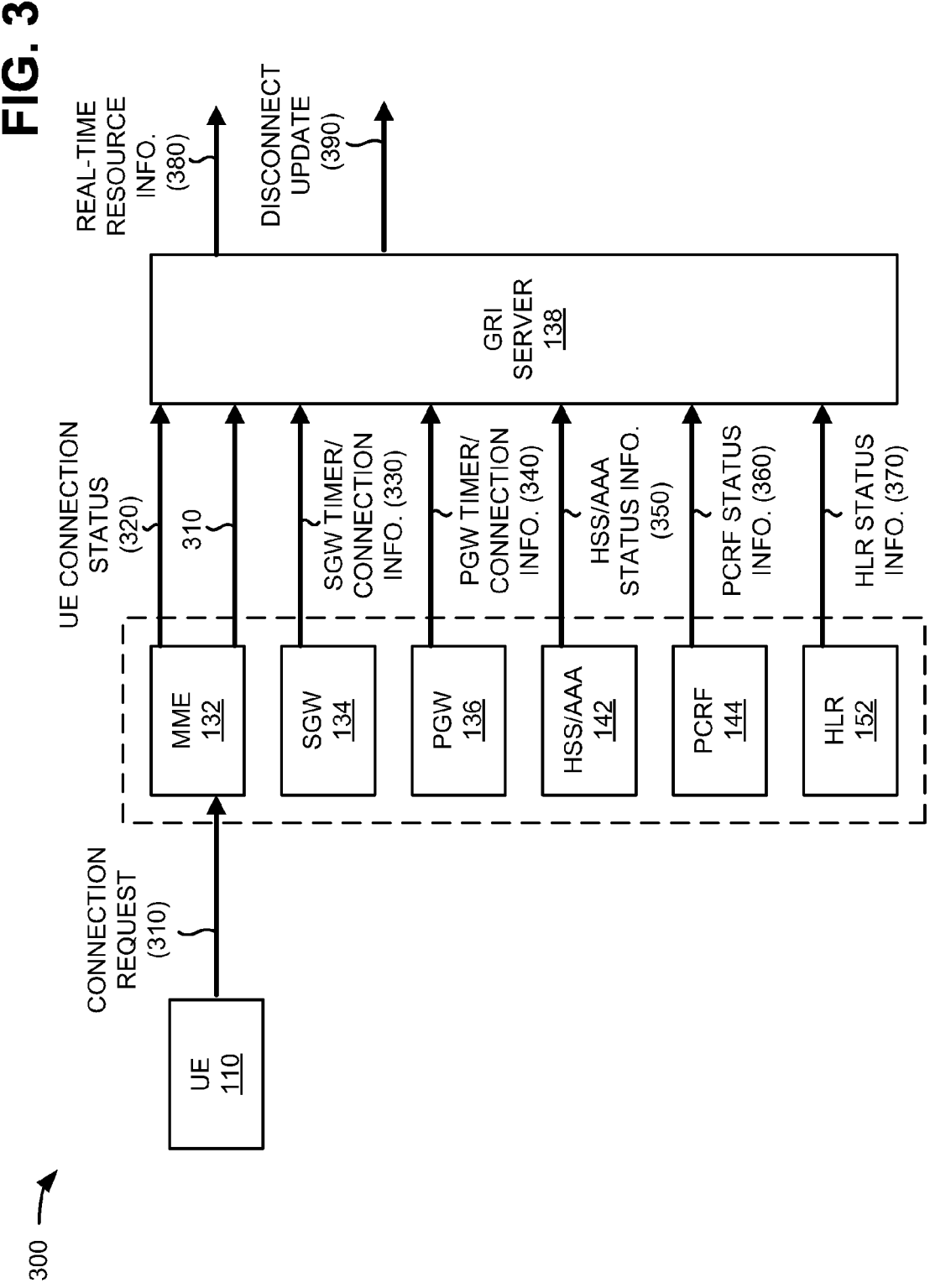
FIG. 3 is a diagram of example interactions among components of an example portion of the network depicted in FIG. 1.

FIG. 3 is a diagram of example interactions among components of an example portion 300 of network 100. As shown, example network portion 300 may include UE 110, MME 132, SGW 134, PGW 136, GRI server 138, HSS/AAA 142, PCRF 144, and HLR 152. UE 110, MME 132, SGW 134, PGW 136, GRI server 138, HSS/AAA 142, PCRF 144, and HLR 152 may include the features described above in connection with one or more of FIGS. 1 and 2.

As further shown in FIG. 3, during initial attachment, UE 110 may provide a connection request 310 to eNB 122 (not shown). Connection request 310 may include a UE identifier, a request to connect (e.g., in order to place a call, access the Internet, etc.) to a network (e.g., network 100), QoS requirements for the connection, etc. For example, connection request 310 may include a request for UE 110 to access the Internet. Connection request 310 may be received by eNB 122 and forwarded to one or more entities of EPC network 130, such as MME 132, SGW 134, and/or PGW 136 to eventually establish a connection.

In one implementation, MME 132 may receive connection request 310 and forward connection request 310 to GRI server 138. GRI server 138 may receive connection request 310 and may create, in a connection database associated with GRI server 138, a database record, for the particular UE connection, based on connection request 310. The database record may include, for example, a UE identification, an IP address for the UE, a connection status for the UE, an eNB and/or cell identifier, current throughput data, an identifier for an application server associated with the UE connection, etc. Some fields of the database record may initially have no values until additional information (e.g., beyond connection request 310) is received by GRI server 138. The connection database is described further in connection with, for example FIGS. 5 and 6.

MME 132 may also track connection times and other connectivity information for UE 110 in the signaling plane. For example, MME 132 may receive (e.g., from eNB 122) and/or track dormancy indications and throughput associated with UE 110. MME 132 may provide this information to GRI server 138 as UE connection status 320. MME 132 may provide UE connection status 320 to GRI server 138, for example, whenever there is a status change in the connection between UE 110 and EPC network 130. A status change may include, for example, a setup or release of a Radio Resource Control (RRC) connection, expiration of a dormancy timer, a handover (e.g., from one eNB 122 to another eNB 122), etc. Alternatively, MME 132 may provide UE connection status 320 to another network entity (e.g., PGW 136) for consolidation and/or forwarding to GRIS 318.

SGW 134 may track resource utilization for UE 110 in the user plane. For example, SGW 134 may include a local resource timer to detect when UE 110 enters an idle state. SGW 134 may provide this information to GRI server 138 as SGW timer/connection information 330. SGW 134 may provide SGW timer/connection information 330 to GRI server 138, for example, whenever there is a state change (e.g., from active state to idle state) for UE 110. Alternatively, SGW 134 may provide SGW timer/connection information 330 to another network entity (e.g., PGW 136) for consolidation and/or forwarding to GRIS 318.

PGW 136 may track resource utilization for UE 110 and/or for connections with other networks. PGW 136 may include a local resource timer to detect when UE 110 enters an idle state. PGW 136 may provide this information to GRI server 138 as PGW timer/connection information 340. Additionally, or alternatively, PGW 136 may consolidate information from MME 132 (e.g., UE connection status 320) and/or SGW 134 (e.g., SGW timer/connection information 330). The consolidated information may be included within PGW timer/connection information 340.

HSS/AAA 142 may track IP connections and AAA services for UE 110. For example, HSS/AAA 142 may track information that enables application servers (e.g., application server 170) to communicate with UE 110 using IP-based communication protocols. HSS/AAA 142 may provide this information to GRI server 138 as HSS/AAA status information 350. HSS/AAA 142 may provide HSS/AAA status information 350 to GRI server 138, for example, whenever there is a new IP session established for UE 110. Alternatively, HSS/AAA 142 may provide HSS/AAA status information 350 to another network entity (e.g., MME 132, PGW 136, etc.) for consolidation and/or forwarding to GRIS 318.

PCRF 144 may provide QoS requirements, bandwidth, and/or charges for a particular service for UE 110. For example, PCRF 144 may dynamically provide real-time bandwidth allocations and/or controls associated with a particular application, network accesses, and/or service (e.g., associated with a particular eNodeB 122) provided to user device 210 during a communication session. PCRF 144 may provide this information to GRI server 138 as PCRF status information 360. PCRF 144 may provide PCRF status information 360 to GRI server 138, for example, whenever UE 110 attempts to access a newly-provisioned service. Alternatively, PCRF 144 may provide PCRF status information 360 to another network entity (e.g., MME 132, PGW 136, etc.) for consolidation and/or forwarding to GRIS 318.

HLR 152 may provide user information, such as address information, account status information, user preferences information, and/or user registration state for a particular UE 110. HLR 152 may provide this information to GRI server 138 as HLR status information 370. HLR 152 may provide HLR status information 370 to GRI server 138, for example, whenever UE 110 attempts establishes a connection with an access point (e.g., eNodeB 122). Alternatively, HLR 152 may provide HLR status information 370 to another network entity (e.g., MME 132, PGW 136, etc.) for consolidation and/or forwarding to GRIS 318.

GRI server 138 may receive UE connection status 320, SGW timer/connection information 330, PGW timer/connection information 340, HLR status information 370, PCRF status information 360, and HLR status information 370 and may store UE connection status 320, SGW timer/connection information 330, PGW timer/connection information 340, HLR status information 370, PCRF status information 360, and HLR status information 370 in the connection database of real-time information (and other information that may be relevant to UE 110 connection). GRI server 138 may provide some or all of the stored information as real-time resource information 380, relating to a particular UE. In one implementation, real-time resource information 380 may be provided to other network elements (e.g., MME 132, SGW 134, PGW 136, etc.). For example, GRI server 138 may provide real-time resource information 380 to a network device upon request (e.g., from the network device). In another implementation, real-time resource information 380 may be provided to devices outside EPC network 130 (e.g., application server 170) upon request from the outside device.

In another implementation, GRI server 138 may automatically send a disconnect update message 390 based on UE connection status 320, SGW timer/connection information 330, PGW timer/connection information 340, HLR status information 370, PCRF status information 360, and/or HLR status information 370. Disconnect update message 390 may include, for example, an indication that UE 110's connection to EPC network 130 has been terminated. Disconnect update message 390 may be provided to, for example, a device (e.g., application server 170) that may be providing services to UE 110.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
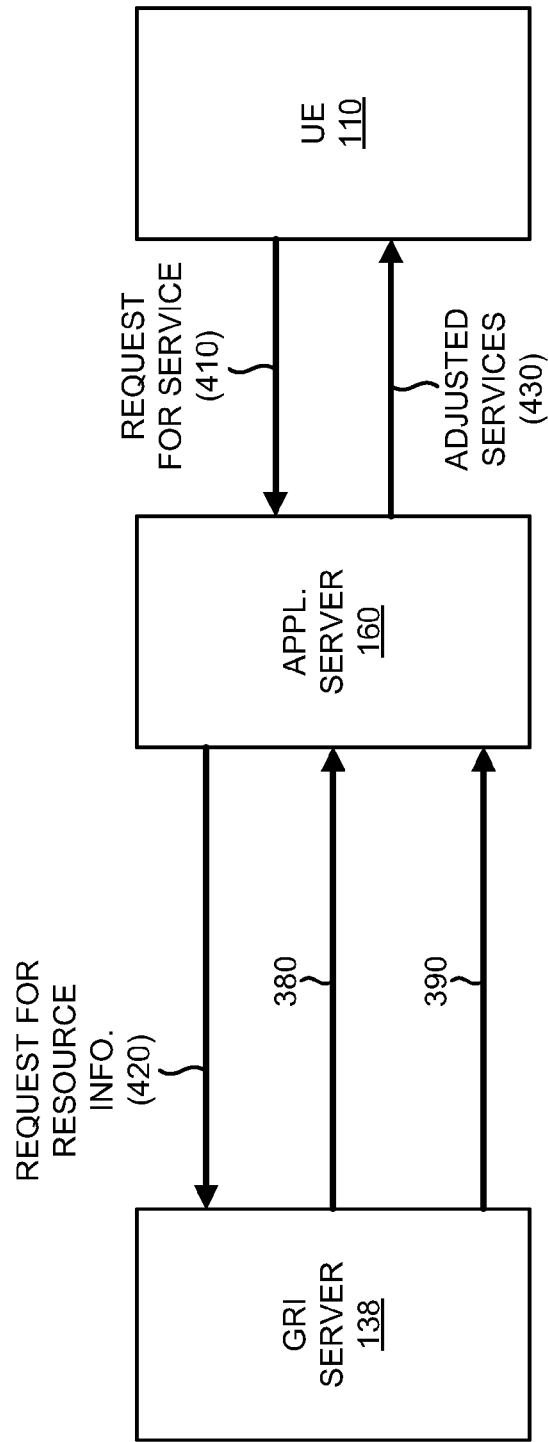
FIG. 4 is a diagram of example interactions among components of another example portion of the network depicted in FIG. 1.

FIG. 4 is a diagram of example interactions among components of another example portion 400 of network 100. As shown, example network portion 400 may include UE 110, GRI server 138, and application server 170. UE 110, GRI server 138, and application server 170 may include the features described above in connection with one or more of FIGS. 1-3.

As further shown in FIG. 4, after attachment to EPC network 130, UE 110 may provide, to application server 170, a request for service 410. Request for service 410 may include, for example, a request for any service that may be provided to UE 110 via network 100, such as Voice-over-Internet-protocol (VoIP) services, location-based services, multimedia services, etc.

Application server 170 may receive request for service 410 and, based on request for service 410, may send a request for resource information 420 to GRI server 138. Request for resource information 420 may include, for example, a request for connection information associated with UE 110 (e.g., the particular UE 110 that generated request for service 410). In one implementation, request for resource information 420 may identify particular fields (e.g., from fields corresponding to a data structure stored in GRI server 138) of requested information.

GRI server 138 may receive request for resource information 420 and may, based on request for resource information 420, send real-time resource information 380 to application server 170. Real-time resource information 380 is described further below in connection with, for example, FIG. 5.

Application server 170 may receive real-time resource information 380 and, based on real-time resource information 380, may provide the requested service (e.g., of request for service 410) to UE 110. In one implementation, application server 170 may adjust one or more attributes of the provided service based on real-time information about the network connection of UE 110, as indicated by reference number 430. For example, if real-time resource information 380 includes an instantaneous bandwidth or bit rate of incoming traffic for UE 110, application server 170 may adjust the quality or content associated with adjusted services 430 to match the bandwidth currently available to UE 110. If UE 110 has a low bandwidth, highly congested link, application server 170 may use, for example, a low-bandwidth, low-resolution video coding scheme. If UE 110 has a good RF signal, application server 170 may use, for example, a higher-quality, higher-bandwidth video coding scheme.

At some time after application server 170 begins to provide adjusted services 430, UE 110 may disconnect (e.g., power off) from core network 130. In response to the change in UE 110 status, GRI server 138 may automatically notify application server 170 of disconnection via disconnect update message 390. Thus, application server 170 may be made aware of the disconnection prior to expiration of, for example, an application timer.

Although FIG. 4 shows example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

Figure 5:
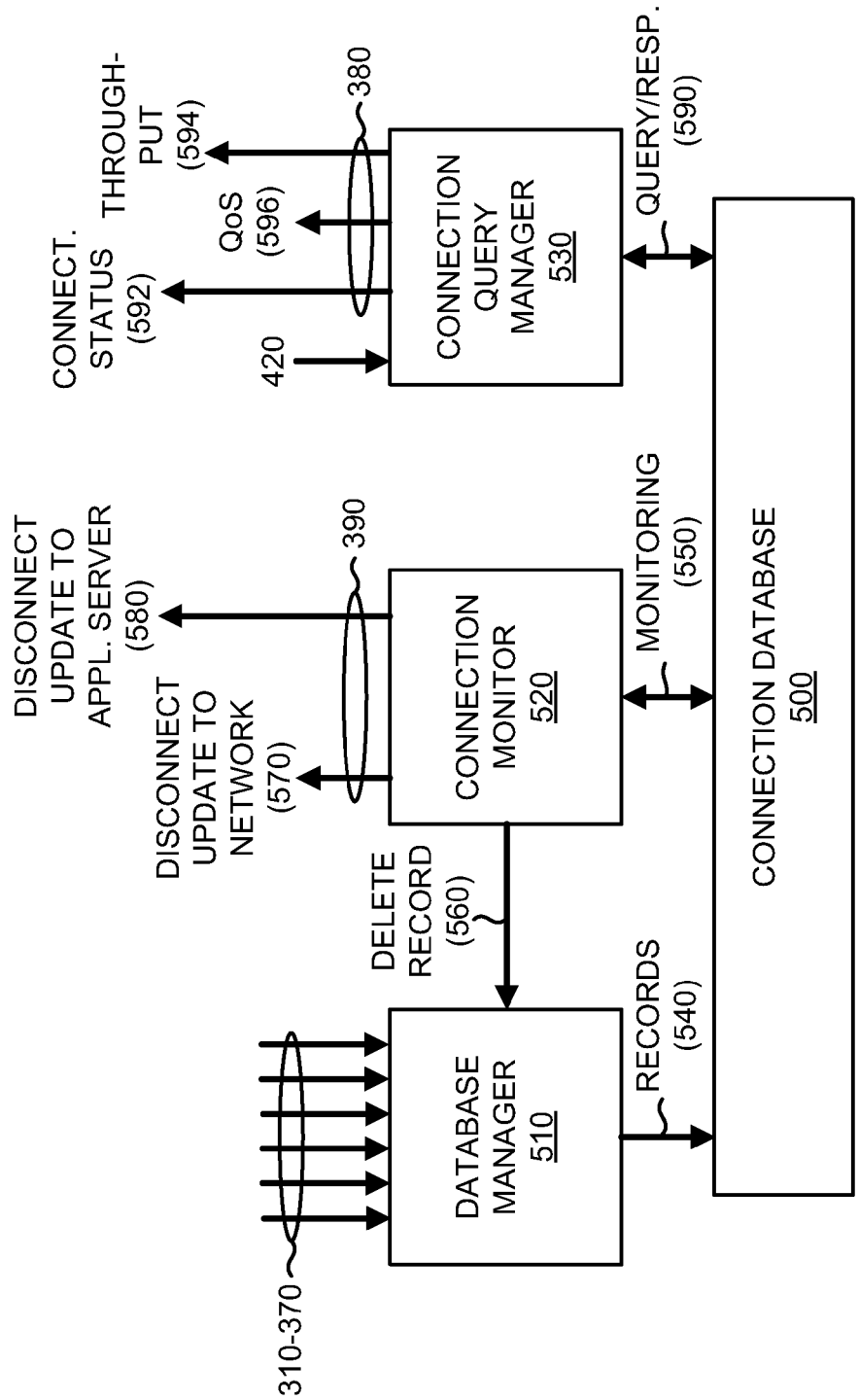
FIG. 5 is a diagram of example functional components of a global resource information server depicted in FIG. 1.

FIG. 5 is a diagram of example functional components of GRI server 138. In one implementation, the functions described in connection with FIG. 5 may be performed by one or more components of device 200 (FIG. 2). As illustrated in FIG. 5, GRI server 138 may include a connection database 500, a database manager 510, a connection monitor 520, and a connection query manager 530.

Connection database 500 may store information associated with network connections of particular UEs 110. Connection database 500 may include real-time or near-real-time connection status based on information provided from other network elements of access network 120, EPC network 130, and/or IMS network 140. Connection database 500 is described further in connection with, for example FIG. 6.

Figure 6:
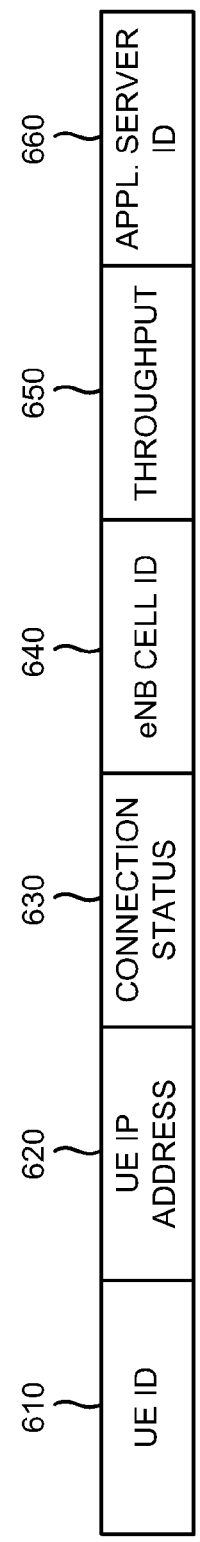
FIG. 6 is a diagram of example fields that may be provided within a connection database according to implementations described herein.

FIG. 6 provides a diagram of example fields that may be provided within a connection database 500 of GRI server 138 according to an implementation described herein. In one implementation, connection database 500 may be implemented in a storage device included as part of memory 230 of GRI server 138. In another implementation, connection database 500 may be stored in a memory associated with another device or a group of devices, separate from or including connection database 500, of EPC network 130. Connection database 500 may include a UE identification (ID) field 610, an IP address field 620, a connection status field 630, an eNB cell ID field 640, a throughput field 650, and an application server ID field 660.

UE ID field 610 may identify a particular UE device 110 that is or has been connected to EPC network 130. For example, UE ID field 610 may store an International Mobile Subscriber Identity (IMSI) number stored in a Subscriber Identity Module (SIM) of UE device 110. In one implementation, UE ID field 610 may be reported to GRI server 138 (and included in database 500) via UE connection status 320.

IP address field 620 may store a particular IP address associated with a UE in a corresponding UE ID field 610. For example, entries for IP address field 620 may be selected from a pool of IP addresses available to EPC network 130 (e.g., PGW 136) and reported via PGW timer connection information 340.

Connection status field 630 may include an indication of whether a UE in corresponding UE ID field 610 is currently connected to the network, is in an idle mode, and or is in an active mode. In one implementation, changes in connection status field 630 may also trigger whether a UE in corresponding UE ID field 610 is included or remains included in database 500. For example, a "disconnected" entry in connection status field 630 may trigger removal of all entries corresponding to the UE in UE ID field 610. In one implementation, removal of the entries, associated with a disconnected status, from connection database 500 may occur after a configurable time interval. In another implementation, connection status field 630 may not include an actual disconnected entry, but instead, GRI server 138 may simply remove entries associated with a disconnected status from connection database 500 whenever information from UE connection status 320, SGW timer/connection information 330, and/or PGW timer/connection information 340 indicates that a connection has been terminated.

eNB cell ID field 640 may identify a particular cell of eNB 122 to which a UE in corresponding UE ID field 610 is connected. Entries for eNB cell ID field 640 may be reported to GRI server 138 via, for example, UE connection status 320.

Throughput field 650 may include an indication of network throughput speeds particular to a connection for a UE in corresponding UE ID field 610. Throughput values may be reported by one or more devices at different locations within access network 120 and/or EPC network 130. For example, throughput field 650 may include a rate (e.g., an instantaneous bandwidth or bit rate) of traffic, such as outgoing traffic from eNB 122 to UE 110. Entries for throughput field 650 may be updated, for example, in real-time, at periodic intervals, and/or upon receiving a request (e.g., request for resource information 420) from another device.

Application server ID field 660 may include an identifier for one or more application servers 170 currently connected to a UE in corresponding UE ID field 610. In one implementation, application server ID field 660 may include an IP address for application server 170. In another implementation, application server ID field 660 may include additional information sufficient to enable GRI server 138 to determine if application server 170 is authorized to receive the requested information.

Although FIG. 6 shows exemplary fields of connection database 500, in other implementations, connection database 500 may contain fewer fields, different fields, additional fields, or differently arranged fields than depicted in FIG. 6. For example, database 500 may include additional information for particular UE connections, such as cell capacity, signal strength, service level agreement (SLA) requirements, usage data rates, etc. Additionally or alternatively, one or more fields of connection database 500 may include information described as being included in one or more other fields of connection database 500.

Returning to FIG. 5, database manager 510 may include hardware or a combination of hardware and software that may receive network connection information from network elements, extract/compile the network connection information, and provide the compiled information as records 540 for connection database 500. For example, database manager 510 may receive connection request 310, UE connection status 320, SGW timer/connection information 330, and/or PGW timer/connection information 340 from network elements (e.g., MME 132, SGW 134, and PGW 136) of EPC network 130. Database manager 510 may identify particular fields, of database 500, associated with information included in connection request 310, UE connection status 320, SGW timer/connection information 330, and/or PGW timer/connection information 340, and may include the identified information as records 540.

Connection monitor 520 may include hardware or a combination of hardware and software that may monitor connection database 500 and inform other devices when a UE (e.g., UE 110) is disconnected from a network (e.g., EPC network 130). For example, connection monitor 520 may perform monitoring 550 of connection database 500 to identify a disconnected status (e.g., in connection status field 630 of database 500) associated with a particular UE connection. If connection monitor 520 identifies that a particular UE 110 is disconnected from EPC network 130, connection monitor 520 may signal database manager 510 to delete (e.g., from database 500) the connection record associated with the particular UE 110, as indicated by reference number 560.

In one implementation, connection monitor 520 may provide a disconnect update 570 to the network, when connection monitor 520 identifies that a particular UE 110 is disconnected from EPC network 130. For example, connection monitor 520 may immediately send a signal to each of MME 132, SGW 134, and PGW 136 to ensure that each network element is aware that UE 110 is no longer connected. Additionally, or alternatively, connection monitor 520 may provide a disconnect update 580 to an application server (e.g., application server 170), when connection monitor 520 identifies that a particular UE 110 is disconnected from EPC network 130. For example, based on database field 660, connection monitor 520 may inform one or more current application servers 170 that UE 110 is disconnected from EPC network 130.

Connection query manager 530 may include hardware or a combination of hardware and software that may receive requests for connection information from application server 170 and may provide the requested connection information to application server 170. For example, connection query manager 530 may receive request for resource information 420. Request for resource information 420 may include a particular UE ID or another connection identifier. In one implementation, request for resource information 420 may also include information about application server 170 that is sufficient to enable connection query manager 530 to determine if application server 170 is authorized to receive the requested information. For example, connection query manager 530 may include a subscription list to verity that a particular application server 170 is authorized to receive network connection information. In other implementations, additional and/or different authentication procedures may be used.

Based on request for resource information 420 (and assuming application server 170 is authorized), connection query manager 530 may perform a query of database 500 and may identify if a connection record is available for the particular requested UE 110, as indicated by reference number 590. If a record is available, connection query manager 530 may provide real-time resource information 380, relating to a particular UE, to application server 170.

In one implementation, real-time resource information 380 may include different types of information (e.g., from fields 610-660 corresponding to database 500) based on particular fields included in request for resource information 420. For example, depending on fields specified in request for resource information 420, real-time resource information 380 may include connection status 592 (e.g., whether UE 110 is connected/disconnected to network 100), throughput 594 (e.g., a real-time bit rate measurement), and/or QoS 596 (e.g., SLA information for a connection) associated with UE 110.

In another implementation, real-time resource information 380 may be supplied as a tiered service (e.g., a subscription-based service to third parties operating application servers 170). For example, connection query manager 530 may associate application server 170 with a particular service tier (e.g., based on a prior registration process with application server 170). Application server 170 may be supplied with different portions (e.g., connection status 592, throughput 594, QoS 596, etc.) of real-time resource information 380 based on a subscription level (e.g., tier 1, tier 2, etc.) associated with application server 170. For example, a lower subscription level may receive only connection status 592 in response to request for resource information 420; while a higher subscription level may receive, for example, connection status 592, throughput 594, and QoS 596.

Although FIG. 5 shows example functional components of GRI server 138, in other implementations, GRI server 138 may include fewer functional components, different functional components, differently arranged functional components, or additional functional components than depicted in FIG. 5. Alternatively, or additionally, one or more functional components of GRI server 138 may perform one or more other tasks described as being performed by one or more other functional components of GRI server 138.

Figure 7:
FIGS. 7 and 8 are flow charts of an example process for providing real-time network resource information and timer synchronization according to implementations described herein.
Figure 8:
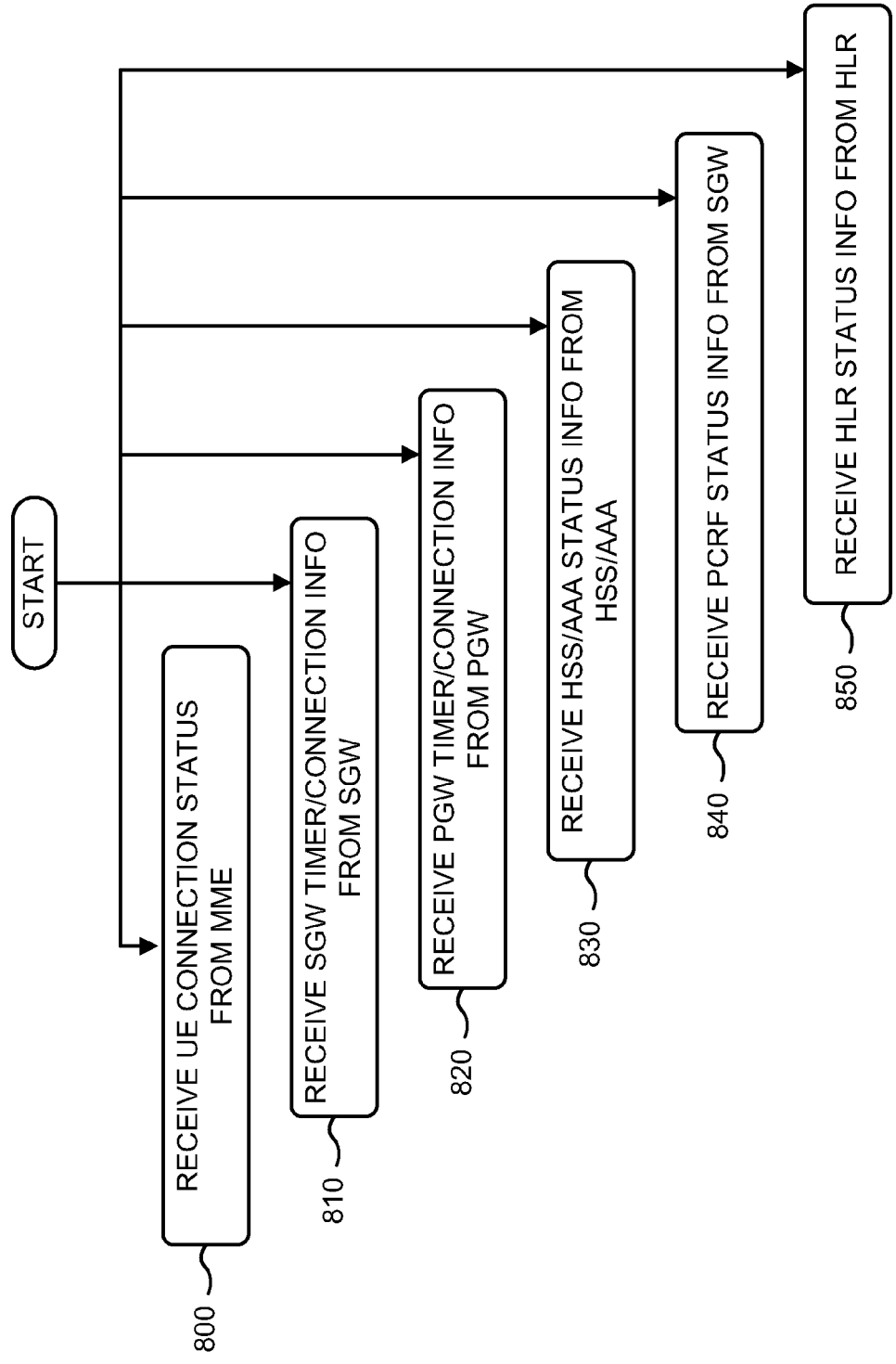

FIGS. 7 and 8 are flow charts of an example process 700 for providing real-time network resource information and timer synchronization according to implementations described herein. In one implementation, process 700 may be performed by GRI server 138. In another implementation, some or all of process 700 may be performed by another device or group of devices, including or excluding GRI server 138.

As shown in FIG. 7, process 700 may include receiving a notice of a connection request from a UE (block 710), and creating a database entry for the UE connection (block 720). For example, in implementations described above in connection with FIG. 3, UE 110 may provide connection request 310 to eNB 122. Connection request 310 may be received by eNB 122 and forwarded to one or more entities of EPC network 130, such as MME 132, SGW 134, and/or PGW 136 to eventually establish a connection. In one implementation, MME 132 may receive connection request 310 and forward connection request 310 to GRI server 138. GRI server 138 may receive connection request 310 and may create, in a connection database associated with GRI server 138, a database record, for the particular UE connection, based on connection request 310. The database record may include, for example, a UE identification, an IP address for the UE, a connection status for the UE, an eNB and/or cell identifier, current throughput data, an identifier for an application server associated with the UE connection, etc.

As further shown in FIG. 7, process 700 may include receiving connection status information from one of multiple core network elements (block 730), updating the database entry for the UE connection (block 740), and determining if the connection status includes a disconnect indication (block 750). For example, in implementations described above in connection with FIG. 5, GRI server 138 (e.g., database manager 510) may receive network connection information from network elements, extract/compile the network connection information, and provide the compiled information as records 540 for connection database 500. GRI server 138 (e.g., connection monitor 520) may monitor connection database 500 and inform other devices when a UE (e.g., UE 110) is disconnected from a network (e.g., EPC network 130). For example, connection monitor 520 may perform monitoring 550 of connection database 500 to identify a disconnected status (e.g., in connection status field 630 of database 500) associated with a particular UE connection.

If the connection status does not include a disconnect indication (block 750—NO), process 700 may return to block 730 to receive additional connection status information. If the connection status includes a disconnect indication (block 750—YES), process 700 may include providing a disconnect message to the core network elements (block 760), providing a disconnect message to an application server (block 770), and triggering deletion of the database entry for the UE connection (block 780). For example, in implementations described above in connection with FIG. 5, if connection monitor 520 identifies that a particular UE 110 is disconnected from EPC network 130, GRI server 138 (e.g., connection monitor 520) may signal database manager 510 to delete (e.g., from database 500) the connection record associated with the particular UE 110, as indicated by reference number 560. Connection monitor 520 may also provide disconnect update 570 to the network, when connection monitor 520 identifies that a particular UE 110 is disconnected from EPC network 130. Additionally, or alternatively, connection monitor 520 may provide disconnect update 580 to an application server (e.g., application server 170), when connection monitor 520 identifies that a particular UE 110 is disconnected from EPC network 130.

Process block 730 may include the process blocks depicted in FIG. 8. As shown in FIG. 8, process block 730 may include receiving UE connection status from a MME (block 800), receiving SGW timer/connection information from a SGW (block 810), and/or receiving PGW timer/connection information from a PGW (block 820). For example, in implementations described above in connection with FIG. 3, MME 132 may receive (e.g., from eNB 122) and/or track dormancy indications and throughput associated with UE 110. MME 132 may provide this information to GRI server 138 as UE connection status 320. SGW 134 may include a local resource timer to detect when UE 110 enters an idle state. SGW 134 may provide this information to GRI server 138 as SGW timer/connection information 330. PGW 136 may track resource utilization for UE 110 and/or for connections with other networks. PGW 136 may provide this information to GRI server 138 as PGW timer/connection information 340. Additionally, or alternatively, PGW 136 may consolidate information from MME 132 (e.g., UE connection status 320) and/or SGW 134 (e.g., SGW timer/connection information 330). The consolidated information may be included within PGW timer/connection information 340.

Process block 730 may further include receiving HSS/AAA status information from an HSS/AAA (block 830), receiving PCRF status information from a PCRF (block 840), and/or receiving HLR status information from a HLR (block 850). For example, in implementations described above in connection with FIG. 3, HSS/AAA 142 may track information that enables application servers (e.g., application server 170) to communicate with UE 110 using IP-based communication protocols. HSS/AAA 142 may provide this information to GRI server 138 as HSS/AAA status information 350. PCRF 144 may dynamically provide real-time bandwidth allocations and/or controls associated with a particular application, network accesses, and/or service (e.g., associated with a particular eNodeB 122) provided to user device 210 during a communication session. PCRF 144 may provide this information to GRI server 138 as PCRF status information 360. HLR 152 may provide user information, such as address information, account status information, user preferences information, and/or user registration state for a particular UE 110. HLR 152 may provide this information to GRI server 138 as HLR status information 370.

Figure 9:
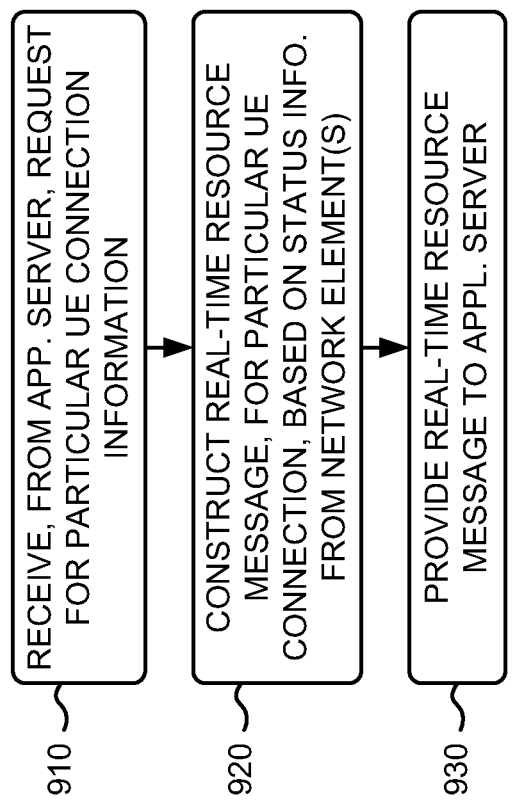
FIG. 9 is a flow chart of another example process for providing real-time network resource information and timer synchronization according to implementations described herein.

FIG. 9 is a flow chart of another example process 900 for providing real-time network resource information and timer synchronization according to implementations described herein. In one implementation, process 900 may be performed by GRI server 138. In another implementation, some or all of process 900 may be performed by another device or group of devices, including or excluding GRI server 138.

As shown in FIG. 9, process 900 may include receiving, from an application server, a request for particular UE connection information (block 910). For example, in implementations described above in connection with FIG. 4, application server 170 may send request for resource information 420 to GRI server 138. Request for resource information 420 may include, for example, a request for connection information associated with UE 110 (e.g., the particular UE 110 that generated request for service 410). In one implementation, request for resource information 420 may identify particular fields (e.g., from fields corresponding to a data structure stored in GRI server 138) of requested information.

As further shown in FIG. 9, process 900 may include constructing a real-time resource message, for the particular UE connection, based on status information from one or more network elements (block 920), and providing the real-time resource message to the application server (block 930). For example, in implementations described above in connection with FIG. 4, GRI server 138 may receive request for resource information 420 and may, based on request for resource information 420, send real-time resource information 380 to application server 170.

Figure 10:
FIG. 10 is a flow chart of an example process for implementing real-time network resource information and timer synchronization according to implementations described herein.

FIG. 10 is a flow chart of an example process 1000 for implementing real-time network resource information and timer synchronization according to implementations described herein. In one implementation, process 1000 may be performed by application server 170. In another implementation, some or all of process 1000 may be performed by another device or group of devices, including or excluding application server 170.

As shown in FIG. 10, process 1000 may include receiving, from a UE, a request for services (block 1010), and sending, to a GRI server, a request for UE connection information (block 1020). For example, in implementations described above in connection with FIG. 4, application server 170 may receive, from UE 110, request for service 410 and, based on request for service 410, may send request for resource information 420 to GRI server 138.

Process 1000 may further include receiving, from the GRI server, real-time resource information for the UE connection (block 1030), provisioning the requested service based on the real-time resource information for the UE connection (block 1040), and providing, to the UE, the provisioned, requested service (block 1050). For example, in implementations described above in connection with FIG. 4, application server 170 may receive real-time resource information 380 and, based on real-time resource information 380, may provide the requested service (e.g., of request for service 410) to UE 110. In one implementation, application server 170 may adjust the provided service based on real-time information about the network connection of UE 110, as indicated by reference number 430. For example, if real-time resource information 380 includes an instantaneous bandwidth or bit rate of incoming traffic for UE 110, application server 170 may adjust the quality or content associated with adjusted service 430 to match the bandwidth currently available to UE 110.

Systems and/or methods described herein may receive, from multiple network elements, status information for a UE connection associated with a wireless core network and may update, based on the status information, a database record for the UE connection. The systems and/or methods may receive, from an application server, a request for information associated with the UE connection and may construct, based on the request and from the database record, a resource message that includes real-time information about the UE connection. The systems and/or methods may send the resource message to the application server. In one implementation, the systems and/or methods may provide a disconnect message to the application server and/or the network elements when the status information received from the network elements indicates that the UE has been disconnected from the wireless core network.

The systems and/or methods described herein may reduce latency of re-allocating network and/or application server resources. Rather than waiting for a local timer to discover that a UE connection has been termination, the systems and methods described herein may provide for immediate notification to network elements in different network layers and to outside application servers. The systems and/or methods may also reduce the need for pings (e.g., from application servers) to determine a UE connection status. Furthermore, the systems and/or methods may provide connection status information to application servers that may be used to optimized services based on the current connection conditions.

The foregoing description of implementations provides illustration and description, but is not intended to be exhaustive or to limit the invention to the precise form disclosed. Modifications and variations are possible in light of the above teachings or may be acquired from practice of the invention. For example, while some descriptions have used terminology associating access network 120 with an LTE network in other implementations an LTE network may be replace with an eHRPD network or another access network. Thus, for example, any of the functions described herein as being performed by MME 132 may be performed by a HSGW if access network 120 is an eHRPD network.

Furthermore, while series of blocks have been described with regard to FIGS. 7-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as a "component" or as "logic" that performs one or more functions. This component or logic may include hardware, such as an ASIC or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method, comprising:
  receiving, by a computing device, notice of a connection request from a user equipment (UE),
    the computing device being different than the UE;
  creating, by the computing device, a database record for a
    UE connection associated with the connection request;

receiving, by the computing device and from a plurality of core network elements, status information for the UE connection,
the computing device being different than the plurality of core network elements;
updating, by the computing device and based on the status information received from the plurality of core network elements, the database record for the UE connection;
determining, by the computing device and based on the status information received from the plurality of core network elements, whether the UE has been disconnected from a network;
providing, by the computing device and to an application server, a disconnect message when the status information received from the plurality of core network elements indicates that the UE has been disconnected from the network,
the computing device being different than the application server;
providing, by the computing device and to one or more of the plurality of core network elements, a disconnect message when the status information, received from the plurality of core network elements, indicates that the UE has been disconnected from the network; and
deleting, by the computing device, the database record when the status information, received from the plurality of core network elements, indicates that the UE has been disconnected from the network.

2. The method of claim 1, where the status information for the UE connection includes:
UE connection status information from a mobility management entity (MME),
UE connection status information from a serving gateway (SGW), or
UE connection status information from a packet data network (PDN) gateway (PGW).

3. The method of claim 1, further comprising:
receiving, from the application server, a request for information associated with the UE connection;
constructing, based on the database record, a real-time resource message; and
sending, to the application server, the real-time resource message.

4. The method of claim 3, where the real-time resource message includes one or more of:
a connection status of the UE,
a throughput value associated with the UE connection,
a quality of service (QoS) designation for the UE connection,
network delay information associated with the UE's current serving network.

5. The method of claim 3, further comprising:
provisioning, based on the real-time resource message, a service provided from the application server to the UE via the UE connection.

6. The method of claim 3, further comprising:
associating information identifying the application server with a particular level of a multi-level subscription service,
where constructing the real-time resource message includes extracting information from the database record based on the particular level of the multi-level subscription service.

7. The method of claim 1, where the computing device comprises a global resource information server.

8. A device, comprising:
a memory to store a plurality of instructions; and
a processor to execute instructions in the memory to:
receive, from a plurality of network elements, status information for a user equipment (UE) connection, of a UE, associated with a wireless core network,
the device being different than the UE and the plurality of network elements;
update, based on the status information received from the plurality of network elements, a database record for the UE connection;
determine, based on the status information received from the plurality of network elements, whether the UE has been disconnected from the wireless core network;
provide, to an application server, a disconnect message when the status information received from the plurality of network elements indicates that the UE has been disconnected from the wireless core network;
provide, to one or more of the plurality of network elements, a disconnect message when the status information received from the plurality of network elements indicates that the UE has been disconnected from the wireless core network; and
delete the database record when the status information, received from the plurality of network elements, indicates that the UE has been disconnected from the wireless core network.

9. The device of claim 8, where the processor is further to execute instructions in the memory to:
create the database record for the UE connection.

10. The device of claim 8, where the plurality of network elements include:
an eNodeB,
a mobility management entity (MME),
a serving gateway (SGW),
a packet data network (PDN) gateway (PGW),
a home subscriber server,
a home location register (HLR), or
a policy and charging rules function (PCRF).

11. The device of claim 8, where the processor is further to execute instructions in the memory to:
receive, from the application server, a request for information associated with the UE connection;
construct, based on the request and from the database record, a resource message that includes real-time information about the UE connection; and
send the resource message to the application server.

12. The device of claim 11, where the resource message includes one or more of:
a connection status of the UE,
a throughput value associated with the UE connection, or
a quality of service (QoS) designation for the UE connection.

13. The device of claim 11, where the processor is further to execute instructions in the memory to:
verify that the application server is authorized to receive the resource message.

14. The device of claim 8, where the device comprises a global real time resource information server.

15. A non-transitory computer-readable medium storing instructions, the instructions comprising:
a plurality of instructions which, when executed by one or more processors of a device, cause the one or more processors to:
receive, from a plurality of network elements, status information for a user equipment (UE) connection, of a UE, associated with a wireless core network, the device being different than the UE and the plurality of network elements;

update, based on the status information received from the plurality of network elements, a database record for the UE connection;

determine, based on the status information received from the plurality of network elements, whether the UE has been disconnected from the wireless core network;

provide, to an application server, a disconnect message when the status information received from the plurality of network elements indicates that the UE has been disconnected from the wireless core network;

provide, to one or more of the plurality of network elements, a disconnect message when the status information received from the plurality of network elements indicates that the UE has been disconnected from the wireless core network; and delete the database record when the status information, received from the plurality of network elements, indicates that the UE has been disconnected from the wireless core network.

16. The non-transitory computer-readable medium of claim 15, where the instructions further comprise:

one or more instructions to receive, from the application server, a request for information associated with the UE connection;

one or more instructions to construct, based on the request and from the database record, a resource message that includes real-time information about the UE connection; and one or more instructions to send the resource message to the application server.

17. The non-transitory computer-readable medium of claim 16, where the resource message includes one or more of:

a connection status of the UE, a throughput value associated with the UE connection, or a quality of service (QoS) designation for the UE connection.

18. The non-transitory computer-readable medium of claim 16, where the instructions further comprise:

one or more instructions to provision, based on the real-time resource message, a service provided from the application server to the UE via the UE connection.

19. The non-transitory computer-readable medium of claim 16, where the status information includes:

UE connection status information from a mobility management entity (MME),

UE connection status information from a serving gateway (SGW), or

UE connection status information from a packet data network (PDN) gateway (PGW).

* * * * *